UNITED STATES PATENT OFFICE.

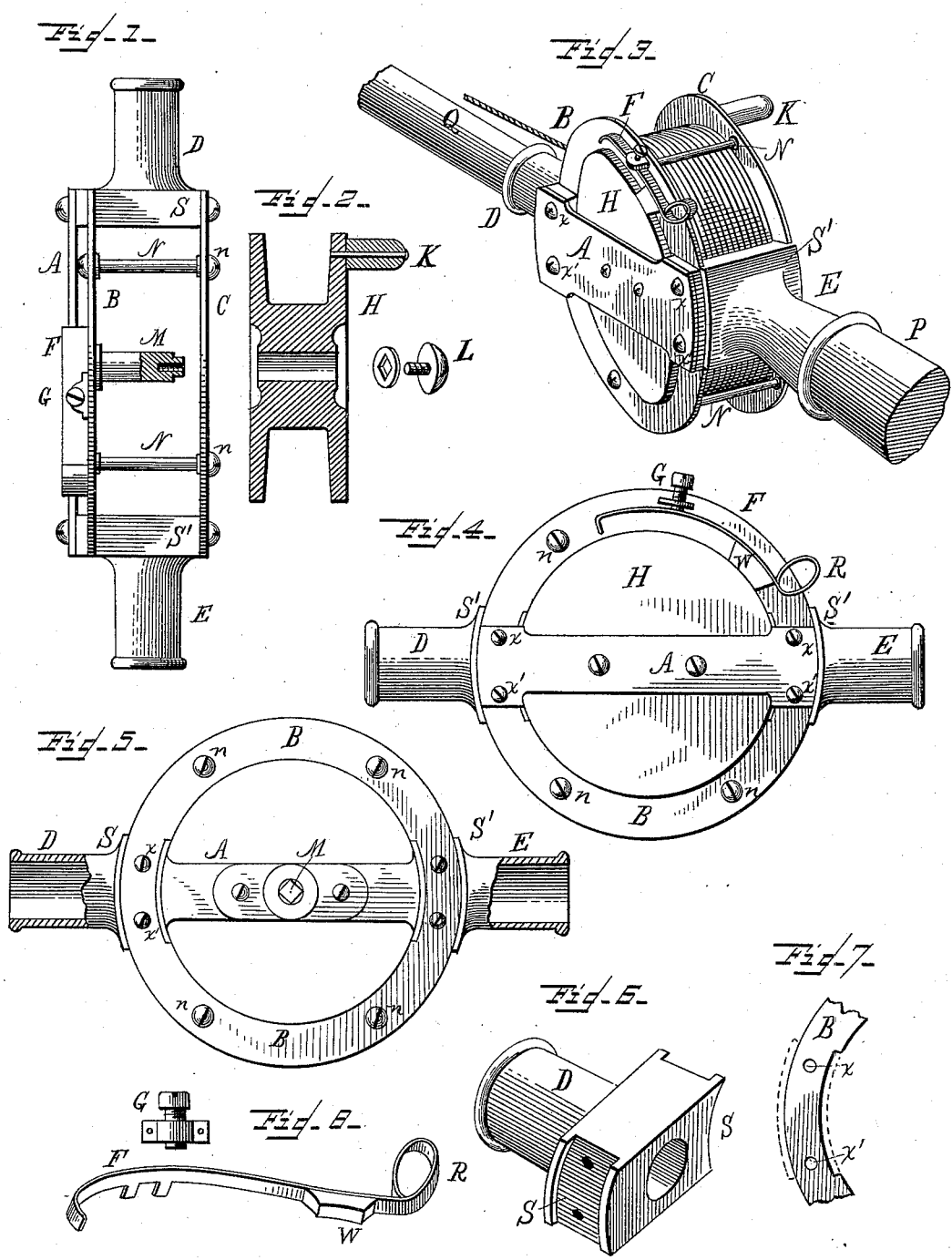

ERASTUS TITUS, JR., OF NEW YORK, N. Y.

FISHING-LINE REEL.

SPECIFICATION forming part of Letters Patent No. 369,622, dated September 6, 1887.

Application filed July 7, 1887. Serial No. 243,653. (No model.)

*To all whom it may concern:*

Be it known that I, ERASTUS TITUS, Jr., a citizen of the United States, residing at New York, in the county and State of New York, have invented certain new and useful Improvements in Fishing-Reels and in the Manner of Attaching them to Fishing-Rods; and I do hereby declare that the following is a full and exact description of my invention, which will enable others skilled in the art to which it appertains to make and use the same.

These improvements consist—

First. In placing the reel in such a position in relation to the rod that the weight is evenly balanced about a line drawn lengthwise through the center of the rod. This is accomplished by means of sockets attached to or forming part of the reel-frame, the butt of the rod being inserted into one socket and the fore end of the rod into the other socket.

Second. In the construction of a drag consisting of a spring attached to the side of the reel-frame and bearing upon the outer edge of the spool upon which the line is wound, said drag being applied at will as an automatic drag, adjustable by means of a set-screw or lever, and admitting of increased pressure as required by the application of the thumb-piece. This thumb-piece is placed upon the free end of the spring, and when the set-screw is released the drag is converted into a thumbing-drag alone, whenever so desired.

The advantages obtained in using my invention are that the rod and reel, when connected, are balanced in every position and free from the top heaviness necessarily existing when the reel is placed on the top of the rod, as is the method now in use. Again, with my invention a larger reel can be employed than is usually used, which gives increased speed in winding up the line, together with slower motion of the reel-handle and less friction.

My invention is applicable to both simple and multiplying reels; but is intended in part to permit of the use of the simple reel for purposes where multiplying reels are commonly employed, it being practical with my invention to make the reel-spools of sufficient diameter to secure any required speed in winding and unwinding the line, while avoiding the complexity, costliness, and the tendency to overrun, unavoidable in multiplying reels. In my form of reel there is only bearing, and this can be oiled by removing one screw and washer. The spool can be removed and replaced in a moment, and spare spools with different sizes or kinds of line can be carried and quickly interchanged, whereby the inconvenience of carrying several entire reels, or having to take off the line and put on another, is done away with.

I will now give a more detailed description of my invention and the construction of the reel and drag, reference being had to the accompanying drawings.

Figure 1 represents a top view of the reel-frame with its sockets. Fig. 2 represents a sectional view of the spool of the reel detached from the frame and ready to be slipped into position. Fig. 3 represents a perspective view of the reel-frame with the rod attached and with the line wound upon the spool. Figs. 4 and 5 represent, respectively, the left and right side of the side bar with sockets and rings attached. Fig. 6 represents in detail the construction of one of the sockets. Fig. 7 represents a portion of the ring of the reel-frame, showing the method of fastening it to the socket. Fig. 8 represents in detail the construction of the drag and set-screw.

In all of the drawings the same letters refer to the same part.

The reel-frame consists (see Fig. 1) of two rings of metal, B and C, or other suitable material, connected at the extremities of the diameter of the ring B by the side bar, A, which carries at its ends the two sockets D and E, to receive the butt and fore end of the rod, respectively. The two rings B and C are still further braced and connected together at intermediate points by the cross-bars N N in the usual way. M is the spindle upon which the spool of the reel revolves. F is a spring fastened at one extremity to the ring B, the other end being free to operate as a drag by pressing upon the edge of the spool as it revolves. This pressure is obtained by means of the set-screw G, or by using the thumb-pressure alone upon the thumb-piece. (Shown at R, Fig. 4.)

Fig. 2 shows the spool H of the reel provided with handle K, and the screw and washer at L to hold the spool upon the spindle M.

Fig. 6 shows the construction of one of the sockets. It consists, essentially, of two parts, the socket proper, D, and the head or cross-piece S. In this specification I shall refer to this part of the socket as the "cross-piece." The two cross-pieces S and S' are slotted, as shown in Figs. 4, 5, and 6, to receive the rings B and C.

Fig. 7 shows how the rings B and C are recessed on the inner circumference to receive the inner lug of slot in the cross-piece, as shown by the dotted lines. The screws $x$ $x'$ fasten the rings to the cross-piece, said screws passing also through the side bar, A. The slotted cross-pieces, fitted as described, give great rigidity and relieve the screws of strain.

Referring, now, to Figs. 4 and 5, the sockets D and E, with their cross-pieces S and S', may be cast in one piece, as shown in the drawings, or may be made of sheet metal where lightness is required. The side bar, A, sustains the spindle M, on which the spool revolves, and rests directly on the rings and cross-pieces S and S', or is set off by bending into the required shape, or by the insertion of washers at the points of attachment (see, also, Fig. 1) to give space for the projection of the side of the spool between the ring and the side bar. The spindle M is attached to the side bar, A, by means of screws, or may be riveted, if intended to remain permanently. The spindle has on its outer end a square shoulder fitted with a washer and nut or screw over the washer. (Shown at L, Fig. 2.) The spool H is inserted from the right side of the frame and the washer put on and the screw or nut turned down. By reversing this process the spool is removed.

Fig. 8 shows the construction of the drag F. It is made of sheet or other metal in one piece. It is fixed at or near one end to the side of the reel-frame by two projections or spurs on the side, which spurs pass through holes in the reel-frame and are bent or riveted down; or the drag may be secured to the frame by means of screws. A short piece on the drag beyond the point of attachment is bent at a suitable angle to brace against any tendency to turn or twist. The metal of which the drag is made is tempered to act as a spring, and is turned or bent at the free end to project above the reel-frame and serve as a thumb-piece, R. The spring may bear directly upon the projecting edge of the spool, or a piece of leather, W, or other suitable material, may be fixed to it at the point of contact to lessen the wear. A set-screw, G, with slotted and milled or fluted head, works through a lug placed on or forming part of the frame, and when turned brings any required pressure upon the spool by forcing down the spring. Additional pressure may be applied, as needed, with the thumb; or the screw may be turned up clear of the spring and the drag used with the thumb alone.

Having described my invention, what I claim, and desire to secure by Letters Patent, is—

1. In a fishing-reel, the two rings of the frame connecting with two sockets extending outward on diametrically-opposite sides of the rings for receiving sections or joints of the pole, whereby the reel may be connected in the pole, as described.

2. In a fishing-reel, the two outwardly-extending sockets connected with the two frame-rings at points diametrically opposite each other, so that they shall be in line and adapted to receive sections of the pole, in combination with side bar, A, extending across one of the rings and connecting with the sockets, as and for the purpose described.

3. In a fishing-reel, a socket having a cross-head provided with side grooves adapted for connection with a section or joint of the pole, and also with the frame-rings, as described.

4. In a fishing-reel, the two sockets having cross-heads, in combination with the two frame-rings connected to opposite sides of the two cross-heads of the sockets and the connecting side bar, as and for the purpose described.

5. In a fishing-reel, the two sockets having cross-heads, as described, in combination with the two connected frame-rings, the side bar, A, and the spindle for carrying the spool connected to such side bar, as and for the purpose described.

6. In a fishing-reel, the two sockets having cross-heads connected to the frame-rings, in combination with the side bar, the connected spindle, and the spool secured to the spindle by a headed screw or nut, as and for the purpose described.

7. In combination with the reel-frame and spool, the spring-drag secured near one end to the frame and the set-screw arranged to press upon the drag and cause it to bear upon the spool, as and for the purpose described.

ERASTUS TITUS, JR.

Witnesses:
 E. T. ROBERTS,
 W. F. CATTERFIELD,
 HUBERT RENVILLE.